(12) United States Patent
Takayama

(10) Patent No.: US 10,293,813 B2
(45) Date of Patent: May 21, 2019

(54) HYBRID VEHICLE

(71) Applicant: TOYOTA JIDOSHA KABUSHIKI KAISHA, Toyota-shi, Aichi-ken (JP)

(72) Inventor: Daiki Takayama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/905,197

(22) Filed: Feb. 26, 2018

(65) Prior Publication Data

US 2018/0251120 A1 Sep. 6, 2018

(30) Foreign Application Priority Data

Mar. 3, 2017 (JP) ................. 2017-040478

(51) Int. Cl.
*B60W 10/06* (2006.01)
*B60W 20/40* (2016.01)
*B60K 6/50* (2007.10)
*B60W 10/08* (2006.01)
B60K 6/445 (2007.10)
B60K 6/48 (2007.10)

(52) U.S. Cl.
CPC ............ *B60W 20/40* (2013.01); *B60K 6/50* (2013.01); *B60W 10/06* (2013.01); *B60W 10/08* (2013.01); *B60K 6/445* (2013.01); *B60K 6/48* (2013.01); *B60K 2006/4825* (2013.01); *B60W 2510/081* (2013.01); *B60W 2520/10* (2013.01); *B60W 2540/10* (2013.01); *B60W 2710/06* (2013.01); *B60W 2710/08* (2013.01); *Y02T 10/6221* (2013.01); *Y02T 10/6239* (2013.01); *Y02T 10/6286* (2013.01); *Y02T 10/7077* (2013.01); *Y10S 903/93* (2013.01)

(58) Field of Classification Search
CPC .............................. B60W 10/24; B60W 10/26
USPC .............................. 180/65.29, 65.265, 65.28
See application file for complete search history.

(56) References Cited

U.S. PATENT DOCUMENTS

| 6,962,224 | B2 * | 11/2005 | Nakanowatari | B60K 6/44 180/65.225 |
| 7,157,869 | B2 * | 1/2007 | Ishikawa | B60K 6/44 318/139 |
| 7,372,222 | B2 * | 5/2008 | Ishikawa | B60K 6/28 318/139 |
| 7,381,146 | B2 * | 6/2008 | Gouda | B60K 6/48 477/3 |
| 7,688,604 | B2 * | 3/2010 | Oyobe | B60L 11/18 318/34 |
| 7,764,051 | B2 * | 7/2010 | Ishikawa | B60K 6/26 322/29 |

(Continued)

FOREIGN PATENT DOCUMENTS

JP 2013-203116 A 10/2013

*Primary Examiner* — Jeffrey J Restifo
(74) *Attorney, Agent, or Firm* — Sughrue Mion, PLLC

(57) ABSTRACT

In a hybrid vehicle including an engine capable of outputting motive power to driving wheels, a motor capable of outputting motive power to the driving wheels and configured to generate a counter-electromotive voltage with rotation, an inverter that drives the motor, an electric storage device connected to the inverter through an electric power line, three phases of the inverter are turned on when an accelerator is turned off while the hybrid vehicle travels with a gate of the inverter being cut off and the engine being operated.

4 Claims, 5 Drawing Sheets

(56) References Cited

U.S. PATENT DOCUMENTS

| | | | | |
|---|---|---|---|---|
| 8,096,376 B2* | 1/2012 | Osawa | ............... | B60W 20/10 |
| | | | | 180/65.27 |
| 8,140,207 B2* | 3/2012 | Nozaki | ............... | B60W 20/30 |
| | | | | 701/22 |
| 8,195,348 B2* | 6/2012 | Mizutani | ............... | B60K 1/02 |
| | | | | 701/22 |
| 8,200,385 B2* | 6/2012 | Ando | ............... | B60K 1/02 |
| | | | | 701/22 |
| 8,335,603 B2* | 12/2012 | Mitsutani | ............... | B60K 6/445 |
| | | | | 180/65.21 |
| 8,342,273 B2* | 1/2013 | Takahashi | ............... | B60K 6/365 |
| | | | | 180/65.275 |
| 8,467,924 B2* | 6/2013 | Shiba | ............... | B60K 6/445 |
| | | | | 701/22 |
| 8,688,300 B2* | 4/2014 | Takahashi | ............... | B60W 10/06 |
| | | | | 701/22 |
| 8,860,423 B2* | 10/2014 | Miyamoto | ............... | G01R 31/362 |
| | | | | 320/116 |
| 8,886,377 B2* | 11/2014 | Morimoto | ............... | B60W 10/06 |
| | | | | 180/65.265 |
| 8,988,078 B2* | 3/2015 | Kiuchi | ............... | G01R 31/3658 |
| | | | | 324/434 |
| 9,174,525 B2* | 11/2015 | Caron | ............... | B60L 11/005 |
| 9,272,704 B2* | 3/2016 | Sato | ............... | B60L 11/12 |
| 9,393,957 B2* | 7/2016 | Hoshiba | ............... | B60K 6/24 |
| 9,499,155 B2* | 11/2016 | Minegishi | ............... | B60W 10/06 |
| 9,688,154 B2* | 6/2017 | Nakamura | ............... | B60L 11/1803 |
| 9,945,910 B2* | 4/2018 | Kiuchi | ............... | H01M 10/48 |
| 9,969,269 B2* | 5/2018 | Nomura | ............... | B60K 6/40 |
| 10,008,969 B2* | 6/2018 | Oba | ............... | B60L 11/04 |
| 10,011,265 B2* | 7/2018 | Kishimoto | ............... | B60W 20/13 |
| 10,046,759 B2* | 8/2018 | Ishikawa | ............... | B60L 11/1803 |
| 10,059,223 B2* | 8/2018 | Komatsu | ............... | B60L 11/126 |
| 2009/0243554 A1* | 10/2009 | Gu | ............... | B60K 6/48 |
| | | | | 320/162 |
| 2010/0121512 A1* | 5/2010 | Takahashi | ............... | B60K 6/445 |
| | | | | 701/22 |
| 2015/0280546 A1* | 10/2015 | Kouno | ............... | H02M 1/36 |
| | | | | 363/132 |
| 2017/0088125 A1* | 3/2017 | Shimizu | ............... | B60W 20/50 |
| 2017/0106852 A1* | 4/2017 | Ando | ............... | B60K 6/365 |
| 2017/0113680 A1* | 4/2017 | Shimizu | ............... | B60K 6/26 |
| 2017/0267231 A1* | 9/2017 | Takakura | ............... | B60W 20/50 |

* cited by examiner

HYBRID VEHICLE

CROSS-REFERENCE TO RELATED APPLICATIONS

The disclosure of Japanese Patent Application No. 2017-040478 filed on Mar. 3, 2017 including the specification, drawings and abstract is incorporated herein by reference in its entirety.

BACKGROUND

1. Technical Field

The present disclosure relates to a hybrid vehicle.

2. Description of Related Art

As a hybrid vehicle of this type, there has been proposed a vehicle including an engine, a first motor, a planetary gear mechanism including a carrier, a sun gear, and a ring gear that are connected to the engine, the first motor, and an output member coupled with driving wheels. The hybrid vehicle also includes a second motor connected to the output member, an inverter that drives the first motor and the second motor, and a battery connected to the inverter through an electric power line (see, for example, Japanese Patent Application Publication No. 2013-203116). When an accelerator is turned on while the hybrid vehicle travels with a gate of the inverter being cut off and the engine being operated, the hybrid vehicle controls the engine based on a direct current-side voltage of the inverter, speed of the output member, and an accelerator operation amount so that a counter-electromotive voltage generated with rotation of the first motor becomes higher than the direct current-side voltage of the inverter. With such control, the hybrid vehicle regulates braking torque based on the counter-electromotive voltage of the first motor, and regulates counterforce torque (driving torque generated in the output member) of the braking torque.

SUMMARY

When an accelerator is turned off while the hybrid vehicle travels with the gate of the inverter being cut off and the engine being operated, the gate of the inverter continues to be in a cut-off state. This may cause failure in securing a sufficient braking force at the time such as when the counter-electromotive voltage of the second motor is equal to or lower than the direct current-side voltage of the inverter.

Accordingly, to solve the problem, a hybrid vehicle is provided which secures braking force of the vehicle when an accelerator is turned off while the vehicle travels with a gate of an inverter being cut off and an engine being operated.

According to one aspect of the present disclosure, there is provided a hybrid vehicle including an engine, a motor, an inverter, an electric storage device, and an electronic control unit. The engine is configured to output motive power to driving wheels. The motor is configured to output motive power to the driving wheels, and generate a counter-electromotive voltage with rotation. The inverter is configured to drive the motor. The electric storage device is connected to the inverter through an electric power line. The electronic control unit is configured to: (i) control the engine and the inverter; and (ii) turn on three phases of the inverter when an accelerator is turned off while the hybrid vehicle travels with a gate of the inverter being cut off and the engine being operated.

Here, the hybrid vehicle may have a plurality of the inverters, the inverters including a plurality of switching elements including upper arms and lower arms, and the electronic control unit may be configured to turn on all the upper arms or the lower arms, when the three phases are turned on.

The hybrid vehicle as described in the foregoing turns on the three phases of the inverter when the accelerator is turned off while the hybrid vehicle travels with the gate of the inverter being cut off and the engine being operated. Here, the phrase "turning on the three phases" indicates that all the upper arms or the lower arms in the plurality of the switching elements of the inverter are turned on. Accordingly, when the three phases are turned on, a drag torque is generated in the motor, so that braking force of the vehicle can be secured.

In such a hybrid vehicle of the present disclosure, the electronic control unit may be configured to: (i) turn on the three phases of the inverter when the accelerator is turned off while the hybrid vehicle travels with the gate of the inverter being cut off and the engine being operated and when the counter-electromotive voltage of the motor is equal to or lower than a direct current-side voltage of the inverter; and (ii) prohibit the three phases from being turned on when the accelerator is turned off while the hybrid vehicle travels with the gate of the inverter being cut off and the engine being operated and when the counter-electromotive voltage of the motor is higher than the direct current-side voltage of the inverter.

According to the hybrid vehicle as described in the foregoing, when the counter-electromotive voltage of the motor is equal to or lower than the direct current-side voltage of the inverter, turning on the three phases of the inverter makes it possible to secure the braking force of the vehicle with a drag torque of the motor. When the counter-electromotive voltage of the motor is higher than the direct current-side voltage of the inverter, the braking force of the vehicle can be secured with regeneration torque based on the counter-electromotive voltage of the motor if the three phases of the inverter is not turned on (if the gate is cut off).

In the hybrid vehicle, the electronic control unit may be configured to: (i) turn on the three phases of the inverter when the accelerator is turned off while the hybrid vehicle travels with the gate of the inverter being cut off and the engine being operated and when vehicle speed is within a specified range; and (ii) prohibit the three phases of the inverter from being turned on when the accelerator is turned off while the hybrid vehicle travels with the gate of the inverter being cut off and the engine being operated and when the vehicle speed is out of the specified range.

The hybrid vehicle as described in the foregoing can select whether to turn on the three phases of the inverter or to prohibit the three phases from being turned on (to cut off the gate) in accordance with the vehicle speed. Here, an upper limit of "specified range" may be a threshold (limit) used for estimating a size relation between the counter-electromotive voltage of the motor and the direct current-side voltage of the inverter without using the counter-electromotive voltage of the motor and the direct current-side voltage of the inverter. A lower limit of "specified range" may be a threshold (limit) used for determining whether or not the vehicle is requested to secure a braking force large to a certain extent.

The hybrid vehicle may further include an electric generator, a planetary gear set, and an electric generator inverter. The planetary gear set may include three rotation elements connected to three shafts, the shafts including a shaft of the electric generator, a shaft of the engine, and a driving shaft coupled with the driving wheels, the rotation elements being connected such that the electric generator, the engine, and the driving shaft are arrayed in the order of the electric generator, the engine and the driving shaft in an alignment chart. The electric generator inverter may be configured to drive the electric generator, the electric generator inverter being connected to the electric storage device through the electric power line. In the hybrid vehicle, the motor may be connected to the driving shaft. The electronic control unit may be configured to: (i) control the engine such that a counter-electromotive voltage of the electric generator becomes higher than the direct current-side voltage of the inverter and a direct current-side voltage of the electric generator inverter, and torque is output from the electric generator to the driving shaft through the planetary gear set when the accelerator is turned on while the hybrid vehicle travels with the gate of the inverter and a gate of the electric generator inverter being cut off and the engine being operated; and (ii) control the engine such that the counter-electromotive voltage of the electric generator becomes equal to or lower than the direct current-side voltage of the inverter and the direct current-side voltage of the electric generator inverter when the accelerator is turned off while the hybrid vehicle travels with the gate of the inverter and the gate of the electric generator inverter being cut off and the engine being operated.

The hybrid vehicle as described in the foregoing can prevent regeneration torque based on a counter-electromotive voltage in the electric generator from being generated when an accelerator is turned off, and thereby prevent torque (driving torque) based on the regeneration torque from being output to the driving shaft.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, modes for carrying out the present disclosure will be described in detail based on embodiments.

Figure 1:
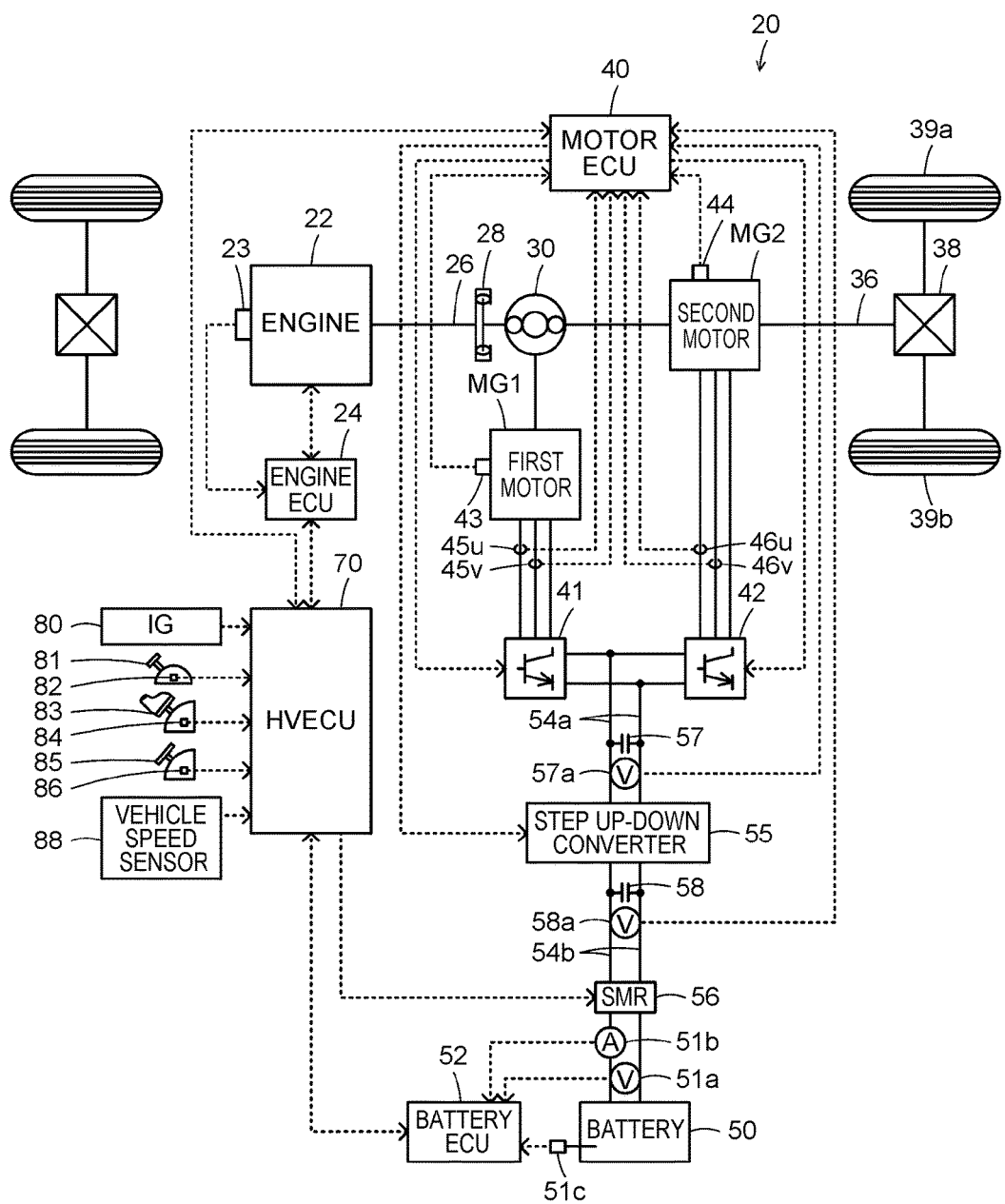
FIG. 1 is a block diagram illustrating an outlined configuration of a hybrid vehicle as one embodiment of the present disclosure.
Figure 2:
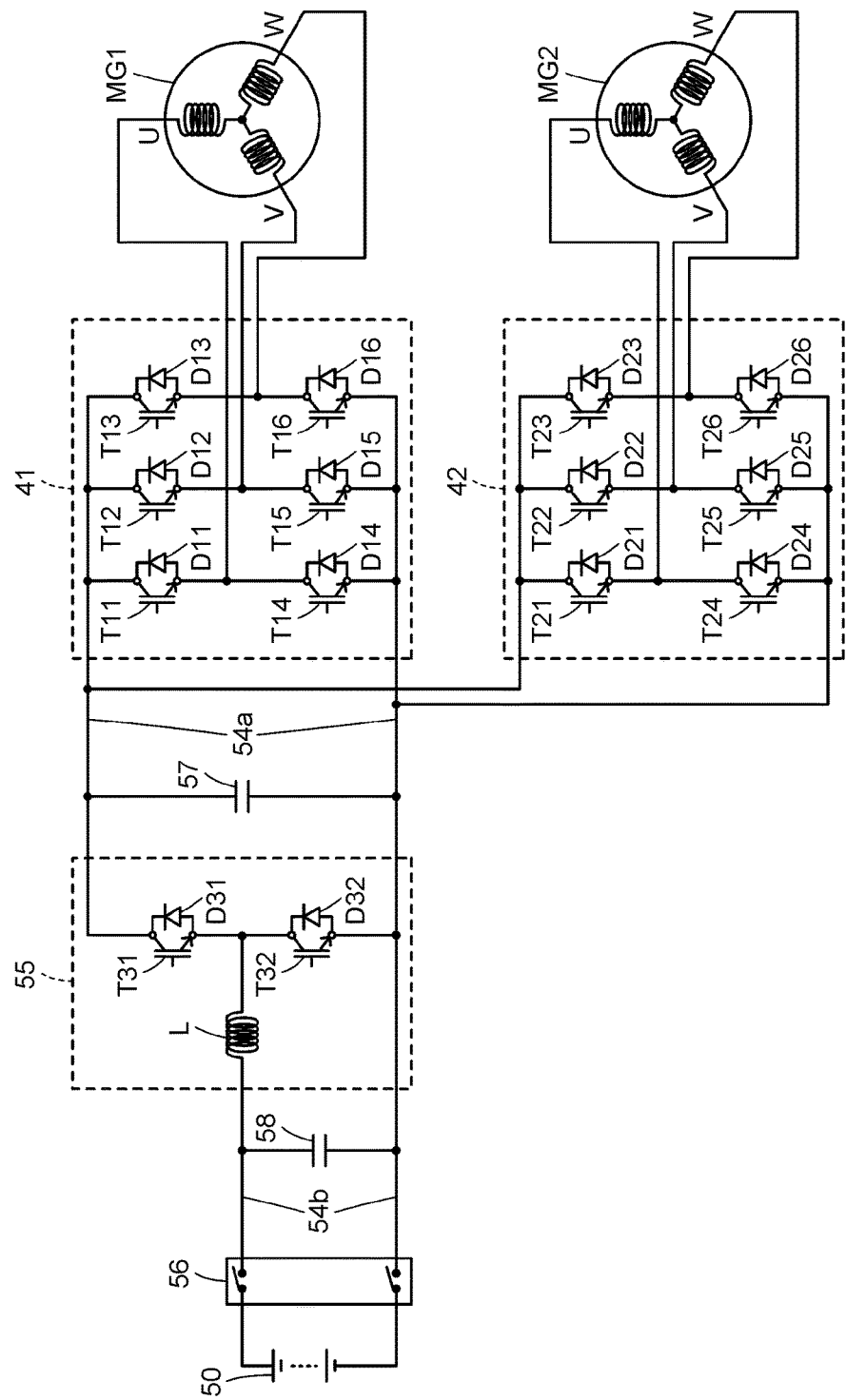
FIG. 2 is a block diagram illustrating an outlined configuration of an electric drive system including a first motor and a second motor illustrated in FIG. 1.

FIG. 1 is a block diagram illustrating an outlined configuration of a hybrid vehicle 20 as one embodiment of the present disclosure. FIG. 2 is a block diagram illustrating an outlined configuration of an electric drive system including a first motor MG1 and a second motor MG2. The hybrid vehicle 20 of the embodiment includes, as illustrated in the drawing, an engine 22, a planetary gear set 30, the first motor MG1, the second motor MG2, an inverter 41, an inverter 42, a step up-down converter 55, a battery 50 as an electric storage device, a system main relay 56, an engine electronic control unit (hereinafter referred to as "engine ECU") 24 and a hybrid electronic control unit (hereinafter referred to as "HVECU") 70.

The engine 22 is configured as an internal combustion engine that outputs motive power by using fuel such as gasoline, and gas oil. The operation of the engine 22 is controlled by the engine ECU 24.

The engine ECU 24 is configured as a microprocessor including a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors necessary for operation control of the engine 22. Examples of the signals include a crank angle θcr from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a speed Ne of the engine 22 based on the crank angle θcr from the crank position sensor 23.

The planetary gear set 30 is configured as a single pinion-type planetary gear mechanism. The planetary gear set 30 has a sun gear connected to a rotator of the first motor MG1. The planetary gear set 30 has a ring gear connected to a driving shaft 36 coupled with driving wheels 39a, 39b through a differential gear set 38. The planetary gear set 30 has a carrier connected to the crankshaft 26 of the engine 22 through a damper 28.

The first motor MG1 is configured as a synchronous generator-motor including a rotator with a permanent magnet embedded therein and a stator with a three-phase coil wound therearound. As described before, the rotator is connected to the sun gear of the planetary gear set 30. The second motor MG2 is configured as a synchronous generator-motor as in the case of the first motor MG1. The second motor MG2 has a rotator connected to the driving shaft 36.

The first inverter 41 and the second inverter 42 are used for driving of the first motor MG1 and the second motor MG2. As illustrated in FIG. 2, the first inverter 41 is connected to a high voltage-side electric power line 54a. The first inverter 41 has six transistors T11 to T16, and six diodes D11 to D16 that are connected in parallel with the six transistors T11 to T16, respectively. The transistors T11 to T16 are disposed in pairs so that their source side and sink side are connected to a positive electrode-side line and a negative electrode-side line of the high voltage-side electric power line 54a, respectively. Junction points between the pairs made from the transistors T11 to T16 are connected to coils of a three-phase coil (U-phase, V-phase, and W-phase) of the first motor MG1, respectively. Therefore, when voltage acts on the first inverter 41, a motor electronic control unit (hereinafter referred to as "motor ECU") 40 regulates a ratio of turn-on time of the pairs of the transistors T11 to T16. As a result, a rotating field is formed in the three-phase coil, so that the first motor MG1 is rotationally driven. Like the first inverter 41, the second inverter 42 is connected to the high voltage-side electric power line 54a. The second inverter 42 also has six transistors T21 to T26 and six diodes D21 to D26. When voltage acts on the second inverter 42, the motor ECU 40 regulates a ratio of turn-on time of the pairs of the transistors T21 to T26. As a result, a rotating field is formed in the three-phase coil, so that the second motor MG2 is rotationally driven.

The step up-down converter 55 is connected to the high voltage-side electric power line 54a and a low voltage-side electric power line 54b. The step up-down converter 55 has two transistors T31, T32, two diodes D31, D32 that are connected in parallel to the transistors T31, T32, and a reactor L. The transistor T31 is connected to the positive electrode-side line of the high voltage-side electric power line 54a. The transistor T32 is connected to the transistor T31, the negative electrode-side line of the high voltage-side electric power line 54a, and a negative electrode-side line of the low voltage-side electric power line 54b. The reactor L is connected to a junction point between the transistor T31 and the transistor T32 and to a positive electrode-side line of the low voltage-side electric power line 54b. As a ratio of turn-on time of the transistors T31, T32 is regulated by the motor ECU 40, the step up-down converter 55 steps up the voltage of electric power of the low voltage-side electric power line 54b and supplies the electric power to the high voltage-side electric power line 54a, or steps down the voltage of electric power of the high voltage-side electric power line 54a and supplies the electric power to the low voltage-side electric power line 54b. The positive electrode-side line and the negative electrode-side line of the high voltage-side electric power line 54a are equipped with a smoothing capacitor 57. The positive electrode-side line and the negative electrode-side line of the low voltage-side electric power line 54b are equipped with a smoothing capacitor 58.

Although not illustrated, the motor ECU 40 is configured as a microprocessor including a CPU as a main component. The motor ECU 40 includes, in addition to the CPU, a ROM that stores processing programs, a RAM that temporarily stores data, input and output ports, and a communication port. As illustrated in FIG. 1, the motor ECU 40 receives input of signals from various sensors necessary for drive control of the first motors MG1, the second motor MG2, and the step up-down converter 55 through the input port. Examples of the signals input into the motor ECU 40 may include rotational positions $\theta m1$, $\theta m2$ from a first rotational position detection sensor 43 and a second rotational position detection sensor 44 that detect rotational positions of the rotators of the first motor MG1 and the second motor MG2, and phase currents Iu1, Iv1, Iu2, Iv2 from current sensors 45u, 45v, 46u, 46v that detect electric current flowing in respective phases of the first motor MG1 and the second motor MG2. The examples of the signals may also include a voltage (high voltage-side voltage) VH of the capacitor 57 (high voltage-side electric power line 54a) from a voltage sensor 57a attached across the terminals of the capacitor 57, and a voltage (low voltage-side voltage) VL of the capacitor 58 (low voltage-side electric power line 54b) from a voltage sensor 58a attached across the terminals of the capacitor 58. The motor ECU 40 outputs various control signals for performing drive control of the first motor MG1 and the second motor MG2 or the step up-down converter 55 through the output port. Examples of the signals output from the motor ECU 40 may include switching control signals to the transistors T11 to T16, T21 to T26 of the first inverter 41 and the second inverter 42, and switching control signals to the transistors T31, T32 of the step up-down converter 55. The motor ECU 40 is connected with the HVECU 70 through the communication port. The motor ECU 40 calculates electrical angles $\theta e1$, $\theta e2$, angular speeds $\omega m1$, $\omega m2$, and speeds Nm1, Nm2 of the first motor MG1 and the second motor MG2 based on the rotational positions $\theta m1$, $\theta m2$ of the rotators of the first motor MG1 and the second motor MG2 from the first rotational position detection sensor 43 and the second rotational position detection sensor 44.

For example, the battery 50 is configured as a lithium-ion secondary battery or a nickel-hydrogen secondary battery. The battery 50 is connected to the low voltage-side electric power line 54b. The battery 50 is managed by a battery electronic control unit (hereinafter referred to as "battery ECU") 52.

Although not illustrated, the battery ECU 52 is configured as a microprocessor including a CPU as a main component. The battery ECU 52 includes, in addition to the CPU, a ROM that stores processing programs, a RAM that temporarily stores data, input and output ports, and a communication port. The battery ECU 52 receives input of signals from various sensors necessary for managing the battery 50 through the input port. Examples of the signals input into the battery ECU 52 may include a voltage Vb of the battery 50 from a voltage sensor 51a attached across the terminals of the battery 50, a current Ib of the battery 50 from a current sensor 51b attached to the output terminal of the battery 50, and a temperature Tb of the battery 50 from a temperature sensor 51c attached to the battery 50. The battery ECU 52 is connected with the HVECU 70 through the communication port. The battery ECU 52 calculates a state of charge SOC based on an integrated value of the electric current Ib of the battery 50 from the current sensor 51b. The state of charge SOC refers to a ratio of capacity of electric power dischargeable from the battery 50 to the total capacity of the battery 50.

The system main relay 56 is provided in a portion of the low voltage-side electric power line 54b closer to the battery 50 side than the capacitor 58. The system main relay 56 connects and disconnects between the battery 50 and the step up-down converter 55 when on-off control of the system main relay 56 is performed by the HVECU 70.

Although not illustrated, the HVECU 70 is configured as a microprocessor including a CPU as a main component. The HVECU 70 includes, in addition to the CPU, a ROM that stores processing programs, a RAM that temporarily stores data, input and output ports, and a communication port. The HVECU 70 receives signals from various sensors through the input port. Examples of the signals input into the HVECU 70 may include an ignition signal from an ignition switch 80, and a shift position SP from a shift position sensor 82 that detects an operative position of a shift lever 81. Examples of the signals may also include an accelerator operation amount Acc from an accelerator pedal position sensor 84 that detects a stepping-in amount of an accelerator pedal 83, a brake pedal position BP from a brake pedal position sensor 86 that detects the stepping-in amount of the brake pedal 85, and a vehicle speed V from a vehicle speed sensor 88. The shift position SP includes a parking position (P position), a reversing position (R position), a neutral position (N position), and a driving position (D position). As described before, the HVECU 70 is connected with the engine ECU 24, the motor ECU 40, and the battery ECU 52 through the communication port.

In the thus-configured hybrid vehicle 20 of the embodiment, request driving force of the driving shaft 36 is set based on the accelerator operation amount Acc and the vehicle speed V, and operation control of the engine 22, the first motor MG1, and the second motor MG2 is performed such that request motive power corresponding to the request driving force is output to the driving shaft 36. Operation modes of the engine 22, for example, the first motor MG1, and the second motor MG2 may include modes (1) to (3) stated below. Both (1) torque conversion operation mode and (2) charging and discharging operation mode are the modes for controlling the engine 22, the first motor MG1, and the second motor MG2 such that the request motive power is output to the driving shaft 36 with operation of the engine 22. Since there is no substantial difference in control between the mode (1) and the mode (2), they are collectively referred to as an engine operation mode. (1) Torque conversion operation mode: a mode for performing operation control of the engine 22 such that the motive power corresponding to the request motive power is output from the engine 22 and for performing drive control of the first motor MG1 and the second motor MG2 such that all the motive power output from the engine 22 is converted to torque by the planetary gear set 30, the first motor MG1, and the second motor MG2 so that the request motive power is output to the driving shaft 36. (2) Charging and discharging operation mode: a mode for performing operation control of the engine 22 such that the motive power corresponding to a sum of the request motive power and electric power necessary for charging and discharging of the battery 50 is output from the engine 22, and for performing drive control of the first motor MG1 and the second motor MG2 such that all or some of the motive power output from the engine 22 is converted to torque by the planetary gear set 30, the first motor MG1, and the second motor MG2 while the battery 50 is charged and discharged so that the request motive power is output to the driving shaft 36. (3) Motor operation mode: a mode for performing drive control of the second motor MG2 such that operation of the engine 22 is stopped and the request motive power is output to the driving shaft 36.

When abnormality occurs in the second inverter 42 and the first inverter 41 or in the sensors (such as the first rotational position detection sensor 43, and the second rotational position detection sensor 44) used for control of the first inverter 41 and the second inverter 42 during operation (rotation) of the engine 22, the hybrid vehicle 20 of the embodiment travels (performs limp home operation) with gates of the first inverter 41 and the second inverter 42 being cut off (all the transistors T11 to T16, T21 to T26 being turned off) and the engine 22 being operated.

When an accelerator is turned on while the hybrid vehicle travels with the gates of the first inverter 41 and the second inverter 42 being cut off and the engine 22 being operated, the HVECU 70 sets a specified speed Nm1 set as a target speed Nm1* of the first motor MG1, and also sets a target voltage VH* of the high voltage-side electric power line 54a such that a counter-electromotive voltage Vcef1 generated with rotation of the first motor MG1 becomes higher than a voltage VH of the high voltage-side electric power line 54a. Here, the counter-electromotive voltage Vcef1 of the first motor MG1 corresponds to a product of an angular speed ωm1 and a counter-electromotive voltage constant Km1 of the first motor MG1. As the specified speed Nm1 set, values such as 4000 rpm, 5000 rpm, and 6000 rpm may be used, for example. As the specified voltage VHset, values such as 330 V, 350 V, and 370 V may be used, for example.

Figure 3:
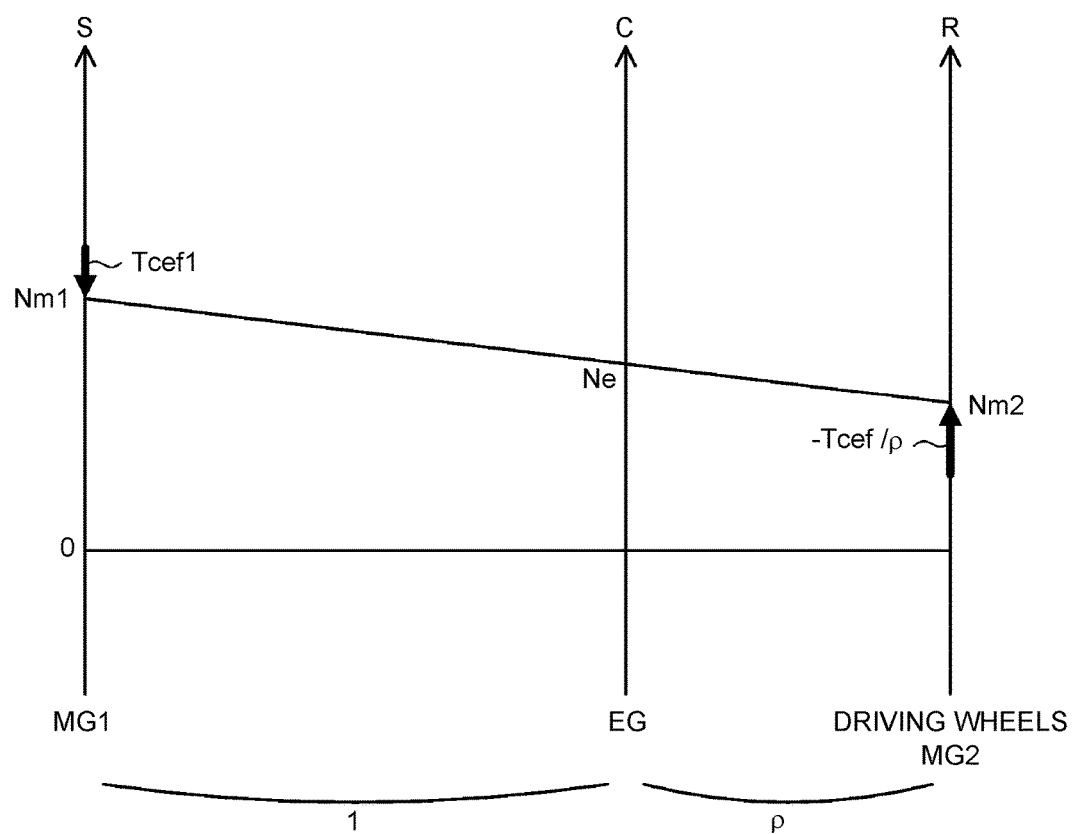
FIG. 3 is an explanatory view illustrating one example of an alignment chart of a planetary gear set when a counter-electromotive voltage of the first motor is higher than the voltage of a high voltage-side electric power line while the gates of the first inverter and the second inverter illustrated in FIG. 1 are in a cut-off state.

FIG. 3 is an explanatory view illustrating one example of an alignment chart of the planetary gear set 30 when the counter-electromotive voltage Vcef1 of the first motor MG1 is higher than the voltage VH of the high voltage-side electric power line 54a while the gates of the first inverter 41 and the second inverter 42 are cut off. In FIG. 3, a left S-axis represents speed of the sun gear of the planetary gear set 30 that is the speed Nm1 of the first motor MG1, a C-axis represents speed of the carrier of the planetary gear set 30 that is the speed Ne of the engine 22, and an R-axis represents speed of the ring gear of the planetary gear set 30 that is the speed Nm2 of the second motor MG2 (and a speed Nd of the driving shaft 36). In FIG. 3, a value "ρ" represents a gear ratio (the number of teeth of the sun gear/the number of teeth of the ring gear) of the planetary gear set 30. As illustrated in the drawing, when the counter-electromotive voltage Vcef1 of the first motor MG1 is higher than the voltage VH of the high voltage-side electric power line 54a, a regeneration torque Tcef1 based on the counter-electromotive voltage Vcef1 is generated in the first motor MG1, and a counterforce torque (−Tcef1/ρ) of the regeneration torque Tcef1 is output to the driving shaft 36 as a driving torque (torque for forward travel). More specifically, the regeneration torque Tcef1 of the first motor MG1 is generated as the first motor MG1 is rotated with operation of the engine 22, and electric power based on the counter-electromotive voltage Vcef1 of the first motor MG1 is rectified by the diodes D11 to D16 of the first inverter 41 and is supplied to the battery 50 through the high voltage-side electric power line 54a, the step up-down converter 55, and the low voltage-side electric power line 54b. Although not illustrated in FIG. 3, when a counter-electromotive voltage Vcef2 of the second motor MG2 is higher than the voltage VH of the high voltage-side electric power line 54a, a regeneration torque Tcef2 based on the counter-electromotive voltage Vcef2 is generated in the second motor MG2, and is output to the driving shaft 36 as a braking torque. The counter-electromotive voltage Vcef2 of the second motor MG2 corresponds to a product of an angular speed ωm2 and a counter-electromotive voltage constant Km2 of the second motor MG2. More specifically, the regeneration torque Tcef2 of the second motor MG2 is generated as the electric power based on the counter-electromotive voltage Vcef2 of the second motor MG2 is rectified by the diodes D21 to D26 of the second inverter 42 and is supplied to the battery 50 through the high voltage-side electric power line 54a, the step up-down converter 55, and the low voltage-side electric power line 54b.

Once the target speed Nm1* of the first motor MG1 is set in this way, a target speed Ne* of the engine 22 is calculated by Expression (1) below with use of the target speed Nm1* of the first motor MG1, the speed Nm2 (speed Nd of the driving shaft 36) of the second motor MG2, and the gear ratio ρ of the planetary gear set 30. The target speed Ne* is transmitted to the engine ECU 24. Here, Expression (1) can easily be derived with reference to FIG. 3. When receiving the target speed Ne* of the engine 22, the engine ECU 24 performs intake air amount control, fuel injection control, and ignition control of the engine 22 so that the speed Ne of the engine 22 becomes the target speed Ne*.

$$Ne^*=(Nm1^* \times \rho + Nm2)/(1+\rho) \quad (1)$$

Thus, the counter-electromotive voltage Vcef1 of the first motor MG1 is made higher than the voltage VH of the high voltage-side electric power line 54a when the accelerator is turned on. As a result, the hybrid vehicle 20 can travel with the driving torque of the driving shaft 36 based on the regeneration torque Tcef1 of the first motor MG1. When the vehicle speed V (speed Nm2 of the second motor MG2) is relatively high, i.e., when the counter-electromotive voltage Vcef2 of the second motor MG2 is higher than the voltage VH of the high voltage-side electric power line 54a, the regeneration torque Tcef2 of the second motor MG2 is output to the driving shaft 36 as a braking torque. Accordingly, the total driving torque of the driving shaft 36 becomes smaller than the torque where the vehicle speed V is relatively low, i.e., when the counter-electromotive voltage Vcef2 of the second motor MG2 is equal to or lower than the voltage VH of the high voltage-side electric power line 54a.

Figure 4:
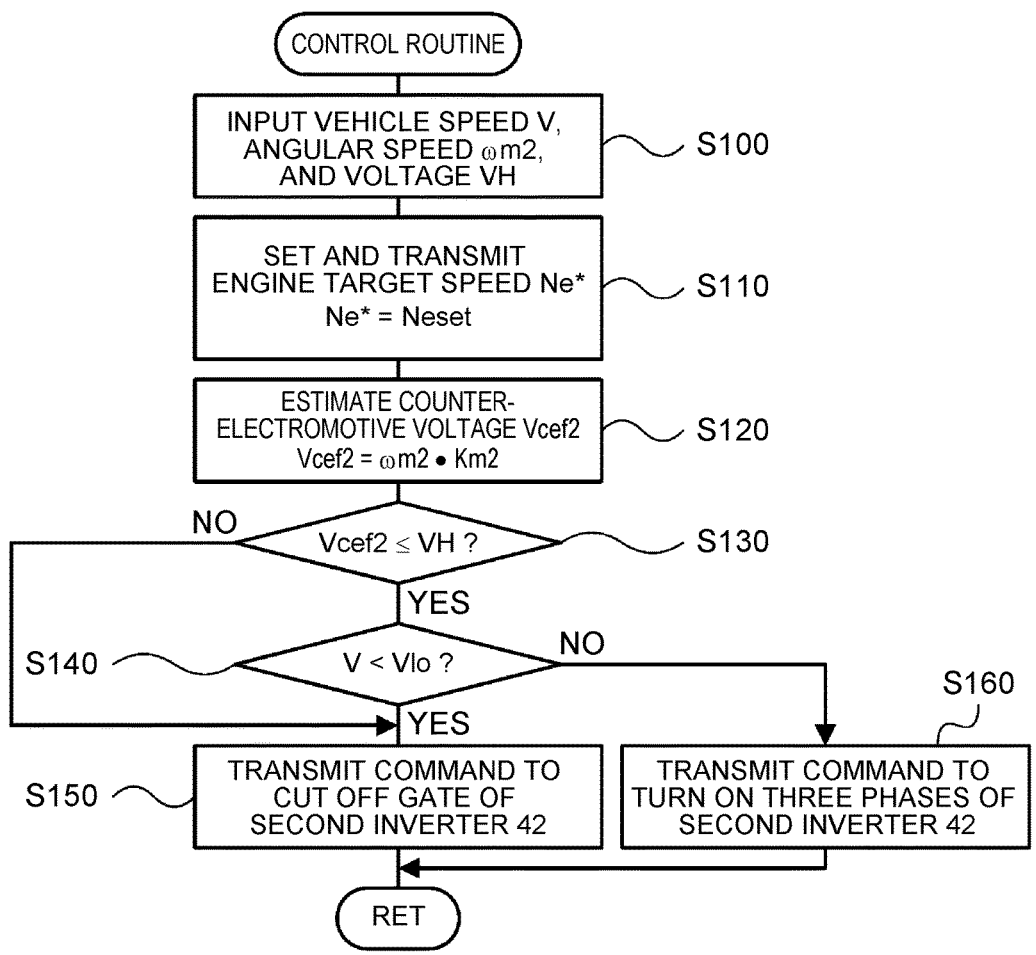
FIG. 4 is a flowchart illustrating one example of a control routine executed by a hybrid electronic control unit illustrated in FIG. 1.

A description is now given of operation of the thus-configured hybrid vehicle 20 of the embodiment, and particularly the operation when the accelerator is turned off while the hybrid vehicle 20 is traveling with the gates of the first inverter 41 and the second inverter 42 being cut off and the engine 22 being operated. FIG. 4 is a flowchart illustrating one example of a control routine executed by the HVECU 70 in the above case. The routine is repeatedly executed until the accelerator is turned on after the accelerator is turned off while the vehicle is traveling with the gates of the first inverter 41 and the second inverter 42 being cut off and the engine 22 being operated. When the accelerator is turned off, the step up-down converter 55 or the first inverter 41 is controlled under cooperative control of the HVECU 70 and the motor ECU 40 as in the case where the accelerator is turned on.

When the control routine of FIG. 4 is executed, the HVECU 70 inputs data such as the vehicle speed V, the angular speed ωm2 of the second motor MG2, and the voltage VH of the high voltage-side electric power line 54a (capacitor 57) (step S100). Here, as the vehicle speed V, a value detected by the vehicle speed sensor 88 is input. As the angular speed ωm2 of the second motor MG2, a value calculated based on the rotational position θm2 of the rotor of the second motor MG2 detected by the second rotational position detection sensor 44 is input from the motor ECU 40 through communication. As the voltage VH of the high voltage-side electric power line 54a, a value detected by the voltage sensor 57a is input from the motor ECU 40 through communication.

Once the data is input, the HVECU 70 sets the target speed Ne* of the engine 22 to a specified speed Neset and transmits the target speed Ne* to the engine ECU 24 (step S110). When receiving the target speed Ne* of the engine 22, the engine ECU 24 controls the engine 22 such that the speed Ne of the engine 22 becomes the target speed Ne*. Here, an allowable lower limit speed Nemin as a lower limit of a speed range where self-sustained operation of the engine 22 is possible (for example, 900 rpm, 1000 rpm, 1100 rpm, etc.), or speeds slightly larger the allowable lower limit speed Nemin may be used as the specified speed Neset, for example. When the engine 22 is rotated at the allowable lower limit speed Nemin in such a way, the speed Nm1 of the first motor MG1 can be made relatively lower than the specified speed Nm1 set. Accordingly, the counter-electromotive voltage Vcef1 of the first motor MG1 is made equal to or lower than the voltage VH of the high voltage-side electric power line 54a so as to prevent generation of the regeneration torque Tcef1 in the first motor MG1 and to thereby prevent the torque (driving torque) based on the regeneration torque Tcef1 from being output to the driving shaft 36.

Next, the HVECU 70 estimates the counter-electromotive voltage Vcef2 of the second motor MG2 as a product of the angular speed ωm2 and the counter-electromotive voltage constant Km2 of the second motor MG2, (step S120), and compares the counter-electromotive voltage Vcef2 of the second motor MG2 with the voltage VH of the high voltage-side electric power line 54a (step S130). When the counter-electromotive voltage Vcef2 of the second motor MG2 is higher than the voltage VH of the high voltage-side electric power line 54a, the HVECU 70 transmits a command to cut off the gate of the second inverter 42 to the motor ECU 40 (step S150), and ends the present routine. When receiving the command to cut off the gate of the second inverter 42, the motor ECU 40 cuts off the gate of the second inverter 42 (continues a cut-off state when the gate is in the cut-off state). In this case, since the regeneration torque Tcef2 is generated in the second motor MG2 and is output as a braking torque to the driving shaft 36, the braking force of the vehicle can be secured.

When the counter-electromotive voltage Vcef2 of the second motor MG2 is equal to or lower than the voltage VH of the high voltage-side electric power line 54a in step S130, the HVECU 70 compares the vehicle speed V with a relatively low threshold Vlo (step S140). Here, the threshold Vlo is a value used for determining whether or not the vehicle is requested to secure a braking force large to a certain extent. For example, the threshold Vlo may take values such as 40 km/h, 50 km/h, and 60 km/h.

When the vehicle speed V is equal to or above the threshold Vlo in step S140, the HVECU 70 determines that the vehicle is requested to secure a braking force large to a certain extent. Accordingly, the HVECU 70 transmits a command to turn on the three phases of the second inverter 42 to the motor ECU 40 (step S160), and ends the present routine. When receiving the command to turn on the three phases of the second inverter 42, the motor ECU 40 turns on the three phases of the second inverter 42 (continues a turn-on state of the three phases when the three phases are in the turn-on state). Here, turning on the three phases of the second inverter 42 means turning on all the transistors T21 to T23 (upper arms) while turning off all the transistors T24 to T26 (lower arms) among the transistors T21 to T26 of the second inverter 42, or turning off all the transistors T21 to T23 (upper arms) while turning on all the transistors T24 to T26 (lower arms). When the counter-electromotive voltage Vcef2 of the second motor MG2 is equal to or lower than the voltage VH of the high voltage-side electric power line 54a, the regeneration torque Tcef2 is not generated in the second motor MG2 even with the gate of the second inverter 42 being cut off. According to the embodiment, the three phases of the second inverter 42 are turned on in this case, so that a drag torque Tdrg2 is generated in the second motor MG2 and is output as a braking torque to the driving shaft 36. As a result, the braking force of the vehicle can be secured.

When the vehicle speed V is less than the threshold Vlo in step S140, the HVECU 70 determines that the vehicle is requested to secure a braking force large to a certain extent. Accordingly, the HVECU 70 transmits to the motor ECU 40 a command to cut off the gate of the second inverter 42 (step S150), and ends the present routine. As a consequence, output of a relatively large braking force to the driving shaft 36 at a relatively low vehicle speed can be suppressed.

In the hybrid vehicle 20 of the embodiment described in the foregoing, when the accelerator is turned off while the hybrid vehicle travels with the gates of the first inverter 41 and the second inverter 42 being cut off and the engine 22 being operated, and when the counter-electromotive voltage Vcef2 of the second motor MG2 is equal to or lower than the voltage VH of the high voltage-side electric power line 54a, and the vehicle speed V is equal to or above the threshold Vlo, the three phases of the second inverter 42 are turned on. Since the three phases of the second inverter 42 are turned on when the counter-electromotive voltage Vcef2 of the second motor MG2 is equal to or lower than the voltage VH of the high voltage-side electric power line 54a, it becomes possible to generate the drag torque Tdrg2 in the second motor MG2 and output the drag torque Tdrg2 as a braking torque to the driving shaft 36 when the regeneration torque Tcef2 based on the counter-electromotive voltage Vcef2 is not generated in the second motor MG2. As a result, the braking force of the vehicle can be secured.

When the accelerator is turned off while the hybrid vehicle 20 of the embodiment travels with the gates of the first inverter 41 and the second inverter 42 being cut off and the engine 22 being operated, the hybrid vehicle 20 selects whether to cut off the gate of the second inverter 42 or to turn on the three phases of the second inverter 42 in accordance with a size relation between the counter-electromotive voltage Vcef2 of the second motor MG2 and the voltage VH of the high voltage-side electric power line 54a. However, the hybrid vehicle 20 may select whether to cut off the gate of the second inverter 42 or to turn on the three phases of the second inverter 42 in accordance a size relation between the vehicle speed V and a relatively high threshold Vhi in place of the size relation between the counter-electromotive voltage Vcef2 of the second motor MG2 and the voltage VH of the high voltage-side electric power line 54a. Here, the threshold Vhi is a value used for estimating the size relation between the counter-electromotive voltage Vcef2 of the second motor MG2 and the voltage VH of the high voltage-side electric power line 54a without using the angular speed ωm2 and the voltage VH. For example, the threshold Vhi may be 80 km/h, 90 km/h and 100 km/h.

When the accelerator is turned off while the hybrid vehicle 20 of the embodiment travels with the gates of the first inverter 41 and the second inverter 42 being cut off and the engine 22 being operated, the hybrid vehicle 20 selects whether to cut off the gate of the second inverter 42 or to turn on the three phases of the second inverter 42 in accordance the size relation between the counter-electromotive voltage Vcef2 of the second motor MG2 and the voltage VH of the high voltage-side electric power line 54a and the size relation between the vehicle speed V and the threshold Vlo. However, the hybrid vehicle 20 may select whether to cut off the gate of the second inverter 42 or to turn on the three phases of the second inverter 42 only in accordance with the size relation between the counter-electromotive voltage Vcef2 of the second motor MG2 and the voltage VH of the high voltage-side electric power line 54a. Or, the hybrid vehicle 20 may select whether to cut off the gate of the second inverter 42 or to turn on the three phases of the second inverter 42 only in accordance with the size relation between the vehicle speed V and the threshold Vlo. The hybrid vehicle 20 may also turn on the three phases of the second inverter 42 irrespective of the size relation between the counter-electromotive voltage Vcef2 of the second motor MG2 and the voltage VH of the high voltage-side electric power line 54a and the size relation between the vehicle speed V and the threshold Vlo.

When the accelerator is turned on while the hybrid vehicle 20 of the embodiment travels with the gates of the first motor MG1 and the second motor MG2 being cut off and the engine 22 being operated, the hybrid vehicle 20 sets the target voltage VH* of the high voltage-side electric power line 54a to a specified voltage VHset, and sets the target speed Nm1* of the first motor MG1 to a specified speed Nm1 set. However, the target speed Nm1* of the motor MG1 and the target voltage VH* of the high voltage-side electric power line 54a may be set such that an absolute value of the regeneration torque Tcef1 of the first motor MG1 and by extension an absolute value of the driving torque to the driving shaft 36 increase more as the accelerator operation amount Acc is larger. In this case, it may be considered to set the target speed Nm1* of the first motor MG1 to a speed that tends to increase more as the accelerator operation amount Acc is larger, or to set the target voltage VH* of the high voltage-side electric power line 54a to a voltage that tends to decrease more as the accelerator operation amount Acc is larger.

Although the hybrid vehicle 20 of the embodiment includes the step up-down converter 55, the hybrid vehicle 20 may not include the step up-down converter 55.

Although the hybrid vehicle 20 of the embodiment uses the battery 50 as an electric storage device, any device may be used as long as the device can store electric power such as a capacitor.

Although the hybrid vehicle 20 of the embodiment includes the engine ECU 24, the motor ECU 40, the battery ECU 52, and the HVECU 70, at least two of the ECUs may be configured as a single electronic control unit.

Figure 5:
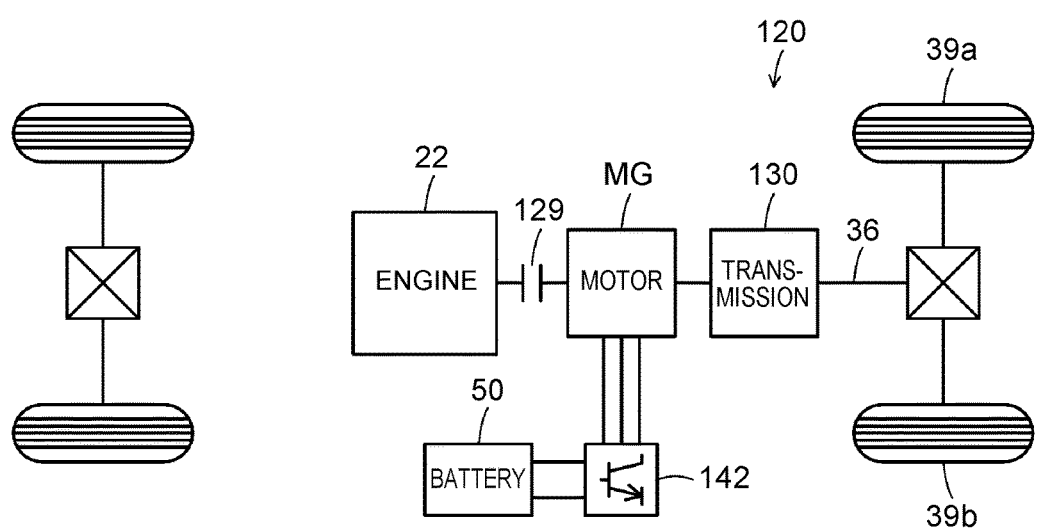
FIG. 5 is a block diagram illustrating an outlined configuration of a hybrid vehicle as a modification of the embodiment of the present disclosure.

In the embodiment, the hybrid vehicle 20 is configured such that the driving shaft 36 coupled with the driving wheels 39a, 39b is connected to the engine 22 and to the first motor MG1 through the planetary gear set 30, and the driving shaft 36 is also connected to the second motor MG2, so that the first motor MG1 and the second motor MG2 are driven by the first inverter 41 and the second inverter 42. However, like a modification illustrated in FIG. 5, the present disclosure may be a hybrid vehicle 120 configured such that a driving shaft 36 coupled with driving wheels 39a, 39b is connected to a motor MG through a transmission 130, and the motor MG is connected to an engine 22 through a clutch 129, so that the motor MG is driven by an inverter 142. In this configuration, when an accelerator is turned on while the hybrid vehicle 120 travels with the gate of the inverter 142 being cut off and the engine 22 being operated, the hybrid vehicle 120 travels with the motive power from the engine 22. When the accelerator is turned off in this state, no-load operation (self-sustained operation) of the engine 22 is performed or fuel cut is carried out, while the three phases of the inverter 142 are turned on, so that the same effects as in the embodiment can be demonstrated.

A description is given of a correspondence relation between main elements of the embodiment and main elements of the present disclosure described in SUMMARY. In the embodiment, the engine 22 is one example of "engine." The second motor MG2 is one example of "motor." The second inverter 42 is one example of "inverter." The battery 50 is one example of "electric storage device." The HVECU 70, the engine ECU 24, and the motor ECU 40 are examples of "electronic control unit." The first motor MG1 is one example of "electric generator." The first inverter 41 is one example of "electric generator inverter."

Since the correspondence relation between the main elements of the embodiment and the main elements of the present disclosure described in SUMMARY is one example to provide a specific description of the mode for carrying out the present disclosure described in SUMMARY, the correspondence relation is not intended to limit the elements of the disclosure described in SUMMARY. More specifically, the disclosure disclosed in SUMMARY should be interpreted based on the description therein, and the embodiment is merely a specific example of the disclosure disclosed in SUMMARY.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the hybrid vehicle.

What is claimed is:

1. A hybrid vehicle, comprising:
an engine configured to output motive power to driving wheels;
a motor configured to output motive power to the driving wheels and generate a counter-electromotive voltage with rotation of the motor;
an inverter configured to drive the motor;
an electric storage device connected to the inverter through an electric power line; and
an electronic control unit configured to:
(i) control the engine and the inverter; and
(ii) turn on three phases of the inverter when an accelerator is turned off while the hybrid vehicle travels with a gate of the inverter being cut off and the engine being operated, wherein
the electronic control unit is configured to:
(i) turn on three phases of the inverter when the accelerator is turned off while the hybrid vehicle travels with the gate of the inverter being cut off and the engine being operated and when vehicle speed is within a specified range; and
(ii) prohibit the three phases of the inverter from being turned on when the accelerator is turned off while the hybrid vehicle travels with the gate of the inverter being cut off and the engine being operated and when the vehicle speed is out of the specified range.

2. The hybrid vehicle according to claim 1, wherein the hybrid vehicle has a plurality of the inverters, the inverters including a plurality of switching elements including upper arms and lower arms, and
the electronic control unit is configured to turn on all the upper arms or the lower arms, when the three phases are turned on.

3. The hybrid vehicle according to claim 1, wherein the electronic control unit is configured to:
(i) turn on three phases of the inverter when the accelerator is turned off while the hybrid vehicle travels with the gate of the inverter being cut off and the engine being operated and when the counter-electromotive voltage of the motor is equal to or lower than a direct current-side voltage of the inverter; and
(ii) prohibit the three phases of the inverter from being turned on when the accelerator is turned off while the hybrid vehicle travels with the gate of the inverter being cut off and the engine being operated and when the counter-electromotive voltage of the motor is higher than the direct current-side voltage of the inverter.

4. A hybrid vehicle comprising:
an engine configured to output motive power to driving wheels;
a motor configured to output motive power to the driving wheels and generate a counter-electromotive voltage with rotation of the motor;
an inverter configured to drive the motor;
an electric storage device connected to the inverter through an electric power line;
an electronic control unit configured to:
(i) control the engine and the inverter; and
(ii) turn on three phases of the inverter when an accelerator is turned off while the hybrid vehicle travels with a gate of the inverter being cut off and the engine being operated
an electric generator,
a planetary gear set including three rotation elements connected to three shafts, the shafts including a shaft of the electric generator, a shaft of the engine, and a driving shaft coupled with the driving wheels, the rotation elements being connected such that the electric generator, the engine, and the driving shaft are arrayed in the order of the electric generator, the engine and the driving shaft in an alignment chart; and
an electric generator inverter that is configured to drive the electric generator, the electric generator inverter being connected to the electric storage device through the electric power line, wherein
the motor is connected to the driving shaft, and
the electronic control unit is configured to:
(i) control the engine such that a counter-electromotive voltage of the electric generator becomes higher than the direct current-side voltage of the inverter and a direct current-side voltage of the electric generator inverter, and torque is output from the electric generator to the driving shaft through the planetary gear set when the accelerator is turned on while the hybrid vehicle travels with the gate of the inverter and a gate of the electric generator inverter being cut off and the engine being operated; and
(ii) control the engine such that the counter-electromotive voltage of the electric generator becomes equal to or lower than the direct current-side voltage of the inverter and the direct current-side voltage of the electric generator inverter when the accelerator is turned off while the hybrid vehicle travels with the gate of the inverter and the gate of the electric generator inverter being cut off and the engine being operated.

* * * * *